United States Patent [19]

Planchard et al.

[11] Patent Number: 4,932,428

[45] Date of Patent: Jun. 12, 1990

[54] BYPASS RELIEF POPPET VALVE

[75] Inventors: David C. Planchard, Shrewsbury; Robert Pandorf, Newton Highlands; Anthony Guerra, Scituate, all of Mass.

[73] Assignee: Helix Technology Corporation, Waltham, Mass.

[21] Appl. No.: 172,558

[22] Filed: Mar. 24, 1988

[51] Int. Cl.⁵ ............................................. F16K 17/08
[52] U.S. Cl. ....................................... 137/12; 137/540
[58] Field of Search ................................. 137/540, 12

[56] References Cited

U.S. PATENT DOCUMENTS

| | | | |
|---|---|---|---|
| 2,653,792 | 9/1953 | Sacchini | 137/540 X |
| 2,655,936 | 10/1953 | Wexler et al. | 137/540 |
| 2,884,004 | 4/1959 | Dierdorf | 137/522 |
| 2,906,289 | 9/1959 | Fox | 137/508 |
| 2,930,401 | 3/1960 | Cowan | 137/540 |
| 2,931,385 | 4/1960 | Carlisle | 137/540 X |
| 2,959,188 | 11/1960 | Kepner | 137/540 |
| 3,006,364 | 10/1961 | Osborn | 137/538 |
| 3,084,710 | 4/1963 | Gondek | 137/540 X |
| 3,189,046 | 6/1965 | Callahan et al. | 137/515.7 |
| 3,255,774 | 6/1966 | Gallagher et al. | 137/516.29 |
| 3,670,766 | 6/1972 | Tyson | 137/540 X |
| 3,756,273 | 9/1973 | Hengesbach | 137/540 |
| 4,096,884 | 6/1978 | Horowitz | 137/627.5 |
| 4,313,463 | 2/1982 | Weirich | 137/538 |
| 4,428,396 | 1/1984 | Wall | 137/493.9 |
| 4,718,442 | 1/1988 | Nicoll | 137/540 X |

FOREIGN PATENT DOCUMENTS 732860 of 1943 Fed. Rep. of Germany .
685200 12/1952 United Kingdom .

Primary Examiner—Robert G. Nilson
Attorney, Agent, or Firm—Hamilton, Brook, Smith & Reynolds

[57] ABSTRACT

The present invention discloses a relief valve containing a poppet valve which is designed to eliminate resonant chattering within the relief valve. The poppet valve contains a plurality of holes of sufficient size and number within the truncated portion of the valve to maintain a fluid pressure difference of about zero between the area within the internal cylinder of the poppet valve and the area within the valve housing about the truncated portion of the poppet cavity.

10 Claims, 3 Drawing Sheets

BYPASS RELIEF POPPET VALVE

BACKGROUND OF THE INVENTION

A typical compressor for a cryogenic refrigerator has a helium supply line which delivers compressed helium to the cryogenic refrigerator, a helium return line which delivers helium from the cryogenic refrigerator to the compressor and, within the compressor, an internal bypass line which lies between the helium supply line and the helium return line.

Situated within the third line is a pressure relief valve, which may open a differential means of from 180 to 240 psi. The line containing the relief valve is present to prevent an excess of pressure from building up in the compressor or supply loop from unwanted flow in the refrigerator. When the maximum predetermined pre-set pressure is reached, the differential pressure relief valve will automatically open to bypass gas flow from the supply line to the return line. Relief valves usually contain a poppet valve which is closed by a spring mechanism, and is forced open when the working fluid pressure against the poppet valve exceeds the force of the spring mechanism, as is shown in U.S. Pat. No. 4,718,442 issued on Jan. 12, 1988 by Harry Nicoll. However, poppet valves used in cryogenic refrigerator compressors of the prior art have been subject to the problem of chatter. As the poppet valve opens and gas flows from the supply line to the return line, the gas pressure across the poppet valve will drop and the spring within the poppet valve will force the valve to close. As the poppet closes, the gas pressure increases again, which tends to open the poppet. These opposing tendencies will lead to resonant "chattering" when the natural period of oscillation of the poppet is equal to the frequency of the driving force created by the flowing gas. The magnitude of the noise from the chatter is many times greater than the background compressor noise and can be quite annoying to persons in the vicinity of the compressor. The chatter can also generate particles and small chips of metal debris which can inhibit sealing of the relief valve and contribute to increased wear due to chatter. The noise can be generated by a lateral or side to side motion of the poppet within the valve.

SUMMARY OF THE INVENTION

The present invention is comprised of a relief valve containing a poppet which is designed to substantially reduce or eliminate chattering within the valve. A poppet cavity within the relief valve is defined by the area between a truncated portion of the poppet valve proximal to the inlet port and an internal ridge which surrounds the inlet port, and against which the end of the poppet valve abuts, to seal the inlet port. The poppet valve of the present invention contains a plurality of holes of sufficient size and number within the truncated portion of the poppet valve to maintain a minimal pressure difference between the pressure within the poppet cavity and the pressure within the internal cylinder about the poppet.

The poppet design is such that a minimal drop in pressure below the threshold pressure at which the poppet opens results in the closing of the valve. As a result the problem of chatter can be reduced or eliminated entirely.

The above, and other features of the invention including various novel details of construction and combination of parts, will now be more particularly described with reference to the accompanying drawings and pointed out in the claims. It will be understood that the particular by-pass relief poppet valve embodying the invention is shown by way of illustration only and not as a limitation of the invention. The principle features of this invention may be employed in various embodiments without departing from the scope of the invention.

DETAILED DESCRIPTION OF THE INVENTION

Figure 1:
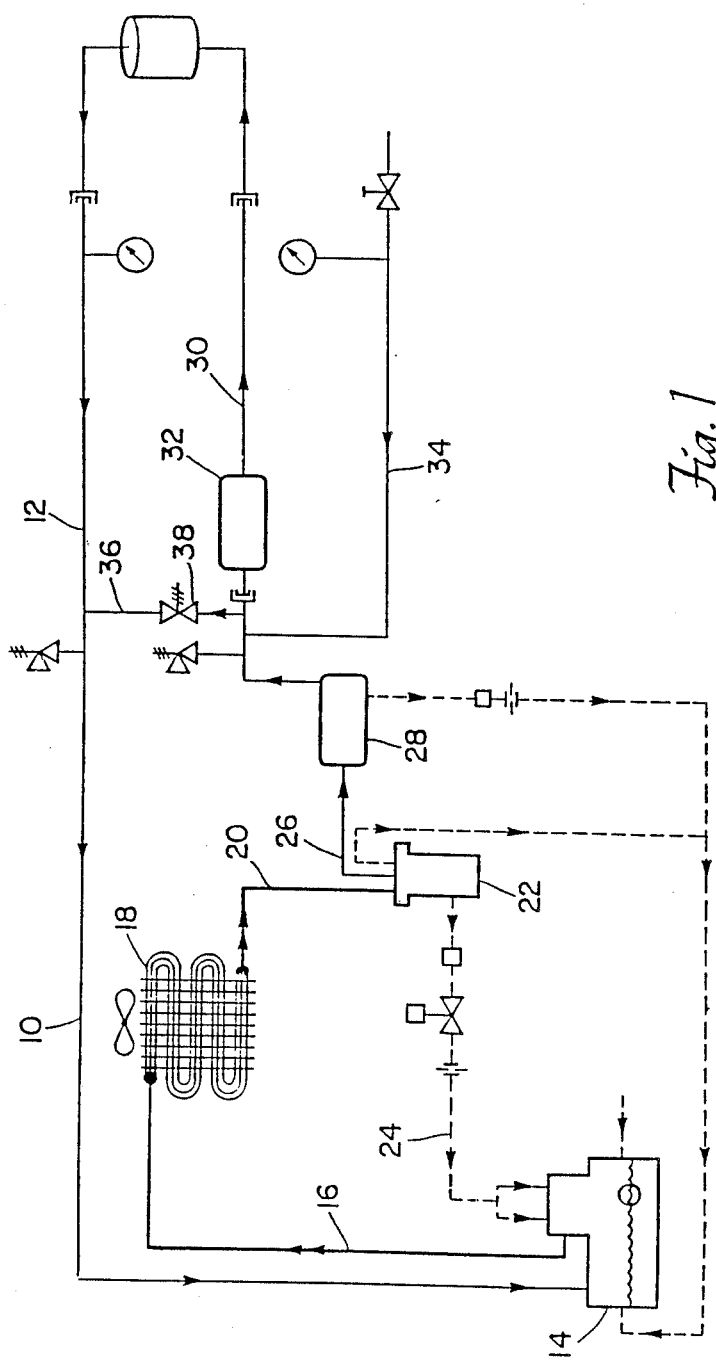
FIG. 1 diagrammatically illustrates a typical cryogenic refrigerator compressor of this invention.

The cryogenic refrigerator compressor unit 10 of FIG. 1 is illustrative of a typical compressor unit for a cryogenic refrigerator. It shows a helium return line 12 which carries returning helium from a cryogenic refrigerator to compressor pump 14. Oil is injected into the helium at the inlet to compressor pump 14 and the oil absorbs the heat of compression of the helium as the helium is being compressed by the compressor pump. The helium-oil mixture is then pumped through line 16 to and through heat exchanger 18. The helium and oil mixture passes from heat exchanger 18 through line 20 to bulk-oil separator 22. The separated oil is returned to the compressor pump 14 via line 24. The helium is pumped from the bulk-oil separator 22 through line 26 to an oil-mist separator 28 where any remaining oil mist is separated from the helium. The helium is pumped from the oil-mist separator 28 through an adsorber 32 which further filters the helium. The helium then travels to the cryogenic refrigerator via helium supply 30. Gas line 34 supplies additional helium to the helium supply line 30 when the system is charged.

Between the helium return line 12 and helium supply line 30 is line 36. An externally adjustable, differential pressure relief valve 38 containing the poppet of the present invention is coupled in line 36. When the pressure differential of the helium between the supply line 30 and return line 12 reaches a certain point beyond the differential pressure necessary to overcome the spring bias against the valve, the valve opens to allow helium to flow from the helium supply line to the helium return line and thus regulate and maintain a safe system pressure in the compressor. Relief valve 38 is so designed such that the pressure setting of the valve can be set externally. Thus, it is not necessary to remove the valve from line 36.

Figure 2:
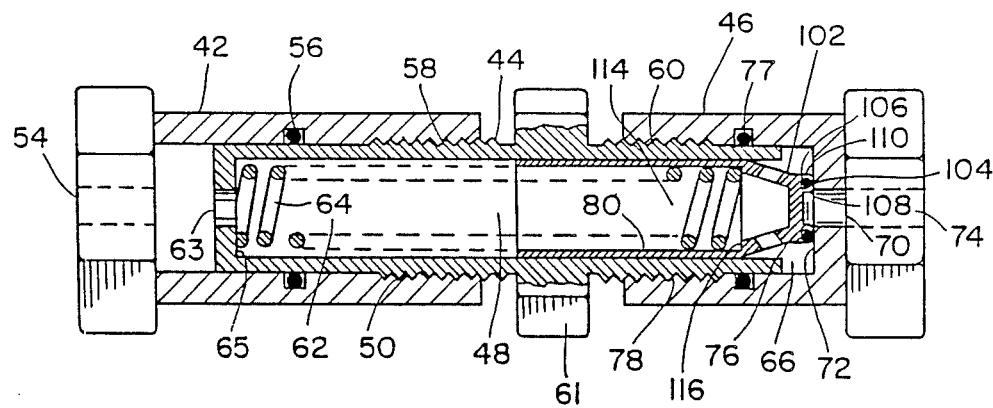
FIG. 2 is a sectional view of the externally adjustable relief valve containing a poppet valve.

FIG. 2 is a sectional view of an externally adjustable relief valve 40. Externally adjustable spring compression member 44 is attached to both outlet member 42 and inlet member 46. Outlet member 42 and inlet member 46 have conventional means for connection to the helium lines at outlet port 54 and inlet port 74, respectively. The valve of FIG. 2 is threaded at the inlet and the outlet ports and connect to the helium line by screwing, but other means such as brazing the valve ports onto the helium line may be used. Outlet member 42, compression member 44, and inlet member 46 are coaxial. Together they define an internal valve duct 48. Outlet member 42 can be attached to the compression member 44 by internal threads 50. Adjacent to internal threads 50 proximal to outlet port 54 is an O-ring 56 recessed within the wall of outlet member 42. The inner circumference of the 0 ring extends beyond the edges of threads 52 so as to produce a seal between the O-ring and the smooth, non-threaded end 52 of the compression member 44 when the compression means is screwed into outlet member 42. This sealing prevents leakage of helium.

Compression member 44 contains two sets of external threads 58 and 60 such that the compression member can be screwed into both the outlet valve 42 and the inlet member 46. In the middle of compression member 44 is an element onto which a wrenching device can be placed in order to turn the compression member. In this case the element is a hex nut 61 which is welded onto the compression member 44. However, the adjustment element can also be flat sections machined on the exterior of the compression member or holes drilled in the periphery of the compression member for a spanner wrench. When final adjustments are made, a lock wire- set screw or epoxy can be applied to the threads of the compression member to prevent rotation. The end of the cylindrical compression member most proximate to the outlet member contains a bore 63 which extends axially therethrough. Bore 63 expands into a cavity 62 into which a spring 64 fits. A retention ridge 65 is formed where bore 63 expands into cavity 62. This retention ridge 65 compresses the spring 64 as the compression member 44 rotates into the inlet member 46 and out of the outlet member.

Inlet member 46 forms internal cavity 66 which narrows into bore 70 forming a sealing ridge 72 proximate to the inlet port 74. Within cavity 66 is a valve member 76 which is in this case a poppet valve. A closing force is placed onto the poppet valve by the spring 64.

Inlet member 46 also has internal threads 78 which enable compression member 44 to translate axially into the cavity 66. Adjacent to internal threads 78 proximal to inlet port 74 is a recessed O-ring 77 within the internal surface of inlet member 46. The inner circumference of the O-ring extends inward beyond the edges of threads 78 so as to produce a seal between said O-ring and the compression member 44.

Poppet valve 76 is comprised of a cylindrical portion 80 proximal to the outlet member and a truncated cone portion 102 which is proximal to the inlet port 74. Cavity 66 is defined by sealing ridge 72 and the exterior of truncated cone 102. Holes are formed in the conical portion 102 to pass gas from cavity 66 to the interior cavity 48 when the valve is open.

As thus far described, the valve is much like that presented in U.S. Pat. No. 4,718,442 by Harry Nicoll issued on Jan. 12, 1988. That valve, however, experienced undesirable chatter under some circumstances.

Figure 3:
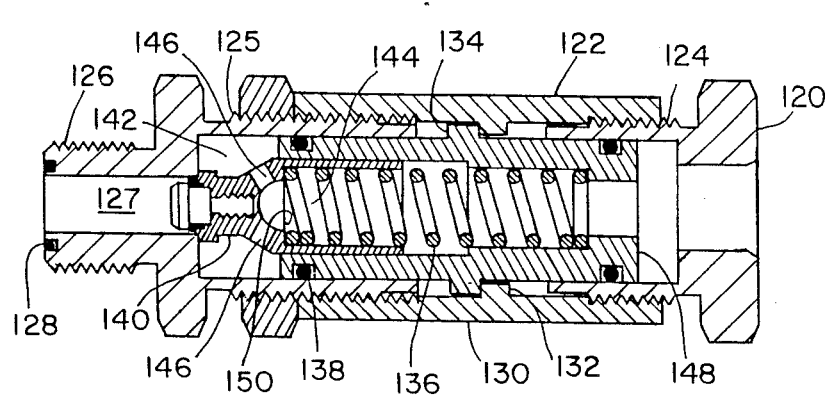
FIG. 3 is a sectional view of the externally adjustable relief valve of the present invention.

The poppet valve of the present invention, illustrated in FIG. 3, is designed such that the pressure within the internal cavity 144 of poppet 140 is approximately the same pressure as the pressure within cavity 142 at all positions of the valve. Thus, as the valve is opened, there are less likely to be pressure oscillations acting on the poppet valve which might result in chatter. This embodiment utilizes an internal cylinder 148 which houses the spring 136. The cylinder 148 is coupled to an external cylinder 122 by ridges 132 and 134. As the external cylinder is screwed along threads 124 and 125 the spring 136 is compressed thereby increasing the pressure necessary in bore 127 to open the valve.

Figure 4:
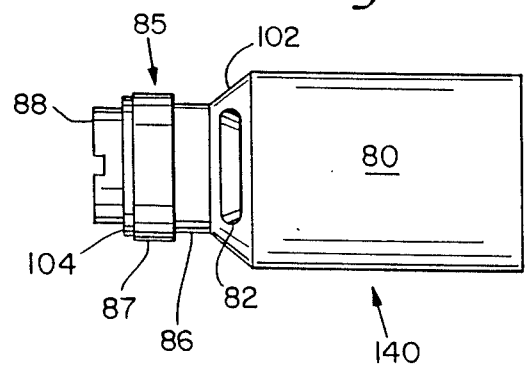
FIG. 4 illustrates a preferred embodiment of poppet valve of the present invention.

In a preferred embodiment, a limited number of elongated holes within the wall of truncated cone 150 minimizes the resistance to gas flow between the two cavities. This modification has further led to improved sealing of the valve when closed. Referring to FIG. 4, there is shown a preferred embodiment of the poppet 140 of the present invention. Poppet 140 is comprised of cylindrical portion 80, truncated cone portion 102, and nose 85 extending out from truncated cone 102. Nose 85 is comprised of 3 sections, section 86 proximal to truncated cone 102, expanded diameter mid-section 87, and section 88 which is distal from truncated cone 102 and has the same diameter as section 86. Section 88 serves as a valve pilot which rides in the bore 127. Within the outer edge of section 87 distal from truncated cone 102 is placed an O-ring or gasket 104. Within truncated cone 102 are two holes. One hole 82 is shown while the other hole 84 is not. Each hole is oval and comprises a total of approximately 17.5% of the surface area of truncated cone 102.

By placing holes of limited number and sufficient size within the truncated portion of the poppet valve, the pressure within space 142 and the pressure within cavity 144 are maintained at approximately the same level. This eliminates the chattering of the poppet valve which has been experienced in pressure relief valves of the prior art. Two elongated holes provide for minimal flow resistance while maintaining the structural integrity of the valve. Additional smaller holes can be used to provide the same total hole area, but flow resistance is a function of both hole size and total hole area. The elongated holes provide as much hole area as the size of the conical portion will allow with only two holes. The holes should not extend outside the conical section as this alters the gas flow through the poppet.

Figure 5:
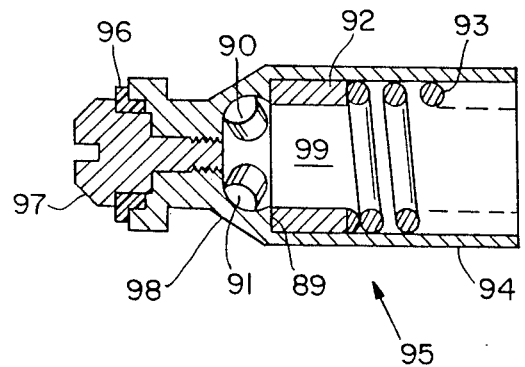
FIG. 5 is a sectional view of another preferred embodiment of the invention.

A further embodiment is illustrated in FIG. 5 in which the poppet 95 has a peripheral surface 94 and an inner cavity 99. Two 90, 91 of the four holes used in this embodiment are shown in this cross-sectional view. This embodiment simplifies the manufacture of a vibration free poppet as the elongated holes depicted in FIG. 4 require a more complicated and time consuming machining procedure. A washer 92 is inserted into the cavity 99 within the poppet. The washer 92 is used to provide a firm support for spring 93 which was found to bind along the inner wall of the truncated section 98 when the washer was not present. Alternatively, an annular surface 89 may be provided having dimensions suitable for supporting the spring 93 while preventing hang-up of the spring when the poppet 95 closes.

To obtain the desired result, no more than four holes should be used to provide a total hole area which is at least 30-35% of the total area of the conical section. This results in a poppet having substantially reduced lateral vibration relative to the housing.

The poppet should go from the open to closed position with the smallest possible drop in pressure between the supply and return lines under the threshold pressure at which the spring is set to open. Where the valve stays open over a large range of pressure around the threshold pressure as in prior art valves, it is likely that a natural frequency of the poppet will fall within that range. By limiting this "transition range" to a small change in pressure, the vibration resulting in chatter can be eliminated. This range should be less than five percent of the pressure at which the poppet opens and preferably less than two percent. For example, where the spring force is adjusted to open where the pressure difference between the lines on opposite sides of the valve is 235 psi (pounds per square inch), a poppet of the present invention having four holes each having a diameter of 0.2 inches, will completely close when the pressure difference drops to 230 psi, or approximately 2% below the opening pressure.

What is claimed:

1. A poppet valve assembly comprising a housing having an inlet port, a poppet valve within the housing, and a spring for pressing the poppet toward one end of the housing to close the inlet port, the poppet comprising a cylindrical section guided by, and laterally moveable relative to, the housing, the poppet having a first cavity therein in which the spring is positioned, a reduced diameter section carrying a sealing element to close the inlet port and a conical section between the cylindrical section and the reduced diameter section, the conical section having holes therein between a second cavity within the housing surrounding the conical section and the first cavity, the combined cross sectional area of the holes produce a pressure differential of gaseous helium passing through the holes when the valve is open that is substantially zero such that the pressure of the helium at the inlet port at which the port is open is substantially equal to the pressure at which the inlet port will close.

2. The poppet valve assembly of claim 1 wherein there are two elongated holes providing a fluid pathway from the second cavity to the first cavity.

3. The poppet valve assembly of claim 2 wherein the combined hole area is at least 30 percent of the total surface area of the conical section.

4. A poppet valve assembly comprising a housing having an inlet port, a poppet valve within the housing, and a spring for pressing the poppet toward one end of the housing to close the inlet port, the poppet comprising a cylindrical section guided by, and laterally moveable relative to, the housing, the poppet having a cavity therein in which the spring is positioned, a reduced diameter section carrying a sealing element to close the inlet port and a conical section between the cylindrical section and the reduced diameter section, the conical section having two elongated holes, together extending about a substantial portion of the circumference of the conical section and across a substantial portion of the width of the conical section to reduce a pressure differential of gaseous helium passing through the holes.

5. The poppet valve assembly of claim 4 wherein said holes are such that there are substantially no vibrations of the poppet lateral to the closing motion of the poppet at the inlet port.

6. The poppet valve assembly of claim 4 further comprising a second cavity within the housing and surrounding the conical section.

7. The poppet valve assembly of claim 6 wherein the pressure of the helium with the second cavity is substantially equal on opposite sides of the conical section.

8. A method of using a bypass relief valve to reduce noise generated by a poppet valve operating within the relief valve comprising:

providing a housing having an inlet port, a poppet valve within the housing, and an adjustable spring for pressing the poppet toward one end of the housing to close the inlet port, the poppet having a lateral resonant frequency and a cylindrical section guided by the housing, a first cavity therein in which the spring is positioned, a reduced diameter section carrying a sealing element to close the inlet port, and a conical section between the cylindrical section and the reduced diameter section, the conical section having holes providing fluid communication between the first cavity and a second cavity within the housing that surrounds the conical section, the combined cross-sectional area of the holes being dimensioned such that the pressure differential of a gas between the first and second cavities is substantially zero;

adjusting the pressure applied by the spring on the poppet to a selected level;

flowing helium through the inlet port where the pressure of the helium at which the port is open is substantially equal to the pressure at which the port closes to reduce lateral vibration of the poppet at the poppets' resonant frequency.

9. The method of claim 8 wherein the pressure at which the port closes is less than five percent lower than the pressure at which the port opens.

10. The method of claim 8 wherein the pressure at which the port closes is less than two percent lower than the pressure at which the port opens.

* * * * *